United States Patent
Kidane et al.

(10) Patent No.: US 9,400,171 B2
(45) Date of Patent: Jul. 26, 2016

(54) OPTICAL WEAR MONITORING

(71) Applicant: Siemens Energy, Inc., Orlando, FL (US)

(72) Inventors: Getnet S. Kidane, Orlando, FL (US);
Upul P. Desilva, Oviedo, FL (US);
Chengli He, Orlando, FL (US); Nancy H. Ulerich, Longwood, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 805 days.

(21) Appl. No.: 13/688,299

(22) Filed: Nov. 29, 2012

(65) Prior Publication Data

US 2013/0266420 A1 Oct. 10, 2013

Related U.S. Application Data

(60) Provisional application No. 61/620,692, filed on Apr. 5, 2012.

(51) Int. Cl.
| | |
|---|---|
| F01D 25/00 | (2006.01) |
| G01B 11/02 | (2006.01) |
| F01D 17/02 | (2006.01) |
| F01D 21/00 | (2006.01) |
| G01B 11/14 | (2006.01) |

(52) U.S. Cl.
CPC .............. *G01B 11/02* (2013.01); *F01D 17/02* (2013.01); *F01D 21/003* (2013.01); *F01D 25/00* (2013.01); *G01B 11/14* (2013.01); *F05D 2260/80* (2013.01)

(58) Field of Classification Search
CPC ..... F01D 17/02; F01D 21/003; F04D 27/001; F05D 2260/80
USPC .................. 415/118; 356/445, 446, 447, 448, 356/237.1, 237.2; 277/321, 415
See application file for complete search history.

(56) References Cited

U.S. PATENT DOCUMENTS

| | | | |
|---|---|---|---|
| 4,876,505 A | 10/1989 | Osborne | |
| 6,080,982 A | 6/2000 | Cohen | |
| 6,615,639 B1 * | 9/2003 | Heinzen | 73/7 |
| 7,270,890 B2 | 9/2007 | Sabol et al. | |
| 7,304,724 B2 * | 12/2007 | Durkin et al. | 356/73 |
| 7,582,359 B2 | 9/2009 | Sabol et al. | |
| 7,618,712 B2 | 11/2009 | Sabol et al. | |
| 7,889,119 B2 | 2/2011 | Evers et al. | |
| 7,952,708 B2 * | 5/2011 | Ravid | G01N 21/253 356/300 |
| 2003/0202188 A1 * | 10/2003 | Discenzso | 356/477 |
| 2005/0018196 A1 * | 1/2005 | Kusuda | 356/448 |
| 2009/0219509 A1 * | 9/2009 | Nomura | G01N 21/55 356/39 |
| 2010/0265493 A1 * | 10/2010 | Jiang et al. | 356/51 |
| 2012/0201656 A1 | 8/2012 | Johnston | |

\* cited by examiner

*Primary Examiner* — Dwayne J White
*Assistant Examiner* — Jason Mikus

(57) ABSTRACT

A gas turbine includes first and second parts having outer surfaces located adjacent to each other to create an interface where wear occurs. A wear probe is provided for monitoring wear of the outer surface of the first part, and includes an optical guide having first and second ends, wherein the first end is configured to be located flush with the outer surface of the first part. A fiber bundle includes first and second ends, the first end being located proximate to the second end of the optical guide. The fiber bundle includes a transmit fiber bundle comprising a first plurality of optical fibers coupled to a light source, and a receive fiber bundle coupled to a light detector and configured to detect reflected light. A processor is configured to determine a length of the optical guide based on the detected reflected light.

20 Claims, 7 Drawing Sheets

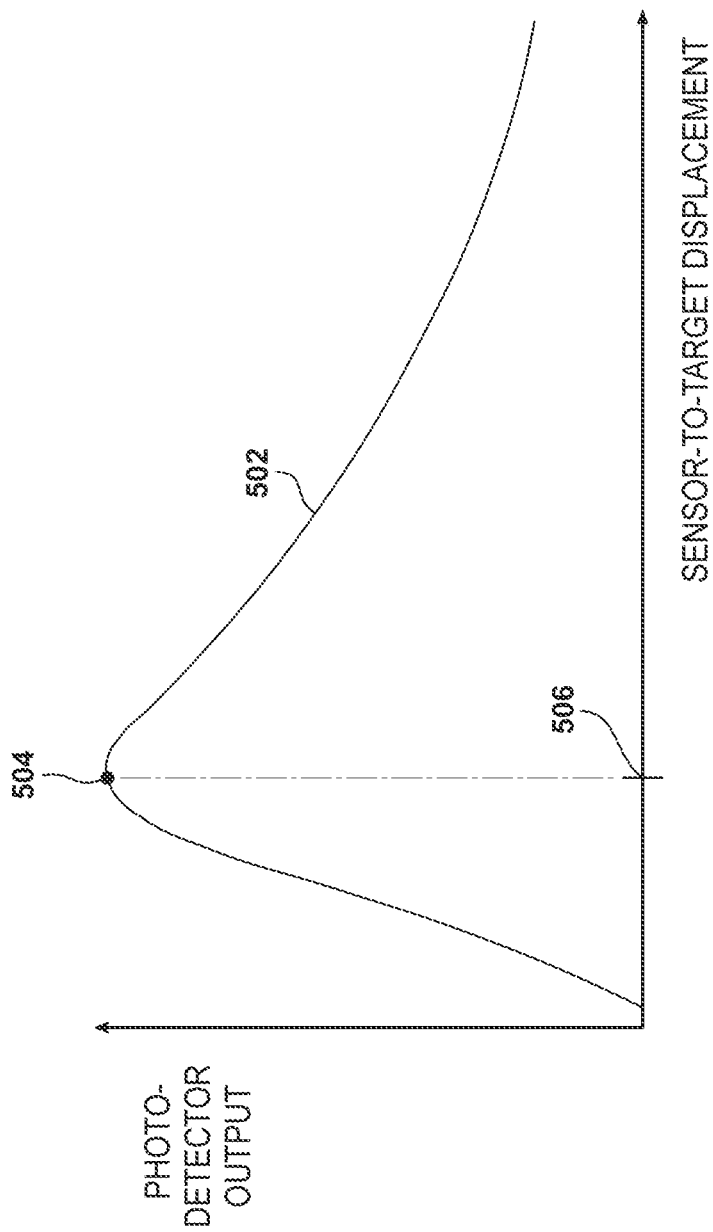

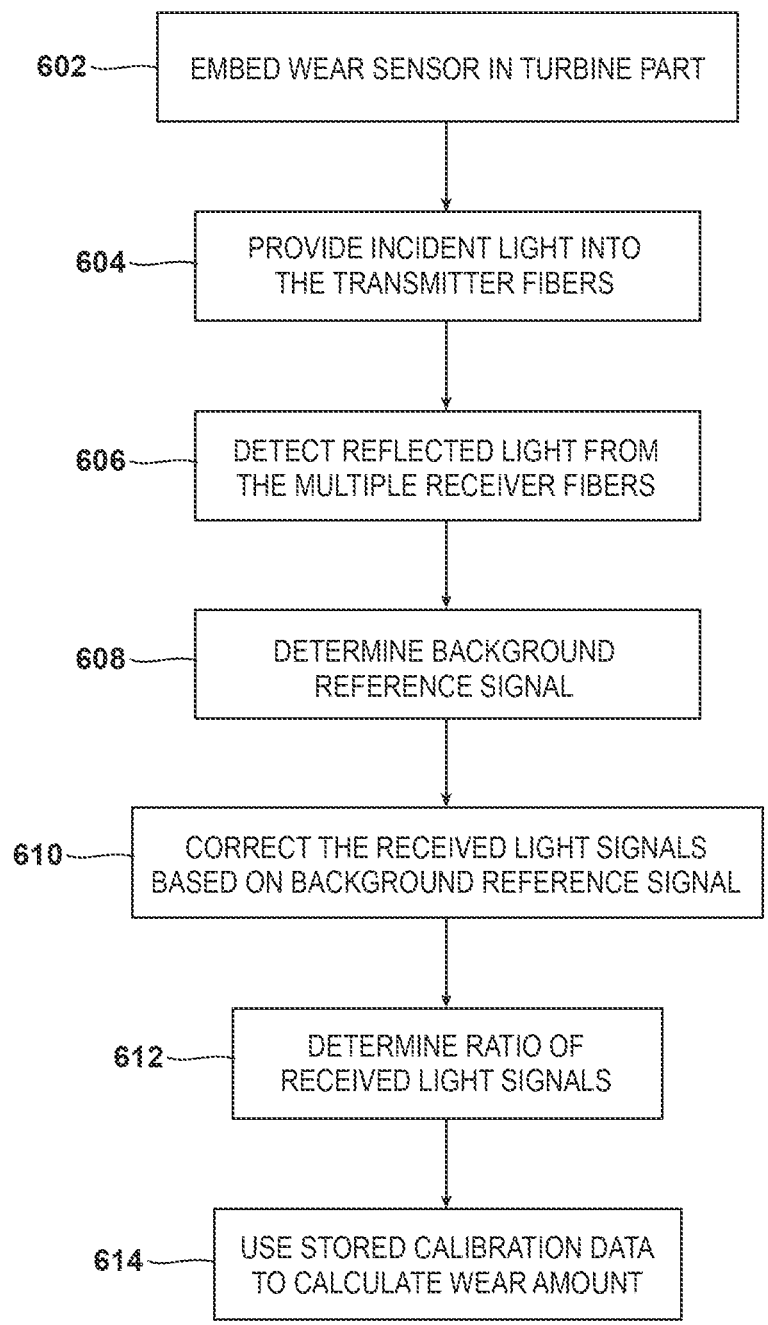

OPTICAL WEAR MONITORING

CROSS REFERENCE TO RELATED APPLICATION

This application claims the benefit of U.S. Provisional Application Ser. No. 61/620,692, filed on Apr. 5, 2012, and entitled "OPTICAL WEAR MONITORING TECHNOLOGY DEVELOPMENT," the entire disclosure of which is incorporated by reference herein.

STATEMENT REGARDING FEDERALLY SPONSORED DEVELOPMENT

Development for this invention was supported in part by Contract No. DE-NT0006833, awarded by the United States Department of Energy. Accordingly, the United States Government may have certain rights in this invention.

FIELD OF THE INVENTION

The present invention relates generally to a measuring assembly for use in a turbine engine, and more particularly, to a measuring assembly for on-line wear monitoring of a surface subject to wearing.

BACKGROUND OF THE INVENTION

Within a high-temperature region of a gas turbine engine, components are exposed to harsh operating conditions and high-temperatures (e.g., about 1000 C). As a result, these parts may have shorter lifetimes and require more frequent inspections than other parts of the turbine engine. In particular, wear damage caused by excessive relative motion at the interface between loosely loaded parts is one common failure mechanism of gas turbine high-temperature section parts. Combustion parts are more prone to wear damage due to a higher level of vibration motion from the harsh operating environment. Typically, to inspect for wear occurring at the interface between two parts requires the gas turbine to be taken offline. Once the gas turbine is offline, visual inspection of the parts occurs as well as physical measurement of the surfaces to determine how much wear has occurred.

Proximity sensors have been used in some instances to measure displacement between two surfaces that are separated by a finite distance. As the displacement between the two surfaces changes, the proximity sensor can detect this change and report information representative of the relative distance between the two parts. Such a proximity sensor, however, is not useful for wear measurement as the two parts that are wearing are doing so because they are touching rather than being separated by some distance.

Thus, there remains a need for a wear sensor that can operate in the high-temperature section of a gas turbine engine and perform real-time condition monitoring without requiring the gas turbine engine to be offline.

SUMMARY OF THE INVENTION

In accordance with an aspect of the invention, a gas turbine includes a first part having a first outer surface and a second part having a second outer surface, wherein the first outer surface is located adjacent the second outer surface to create an interface where wear occurs. A wear probe, is embedded in the first part, for monitoring wear of the first outer surface. The wear probe includes an optical guide having a first end and a second end, wherein the first end is configured to be located flush with the first outer surface; and a fiber bundle having a first end and a second end, the first end of the fiber bundle located proximate to the second end of the optical guide. Furthermore, the fiber bundle includes a transmit fiber bundle comprising a first plurality of optical fibers; and a receive fiber bundle comprising a second plurality of optical fibers. The wear probe also includes a light source coupled with the second end of the transmit fiber bundle and configured to provide light to the second end of the transmit fiber bundle; a light detector coupled with the second end of the receive fiber bundle and configured to detect reflected light captured by the first end of the receive fiber bundle; and a processor configured to determine a length of the optical guide based on the detected reflected light.

In accordance with another aspect of the invention, a method for monitoring wear of a part having a wearing surface that includes providing an optical guide having a first end and a second end, wherein the first end is positioned flush with the wearing surface; and positioning a fiber bundle having a first end and a second end, the first end of the fiber bundle to be located proximate to the second end of the optical guide. The method further includes transmitting light from a light source through the fiber bundle to the second end of the optical guide; receiving, at the first end of the bundle, reflected light from the first end of the optical guide, and transmitting the reflected light through the fiber bundle to a light detector for detecting the reflected light; and determining a length of the optical guide based on the detected reflected light.

In accordance with another aspect of the invention, a wear probe for monitoring wear of a part having a wearing surface includes an optical guide having a first end and a second end, wherein the first end is configured to be located flush with the wearing surface; and a fiber bundle having a first end and a second end, the first end of the fiber bundle located proximate to the second end of the optical guide. In particular, the fiber bundle includes a transmit fiber bundle comprising a first plurality of optical fibers; and a receive fiber bundle comprising a second plurality of optical fibers. The wear probe also includes a light source coupled with the second end of the transmit fiber bundle and configured to provide light to the second end of the transmit fiber bundle; a light detector coupled with the second end of the receive fiber bundle and configured to detect reflected light captured by the first end of the receive fiber bundle; and a processor configured to determine a length of the optical guide based on the detected reflected light.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 5C illustrates a graph of the output of an optical proximity sensor that detects light received from a "target";

FIG. 7 depicts a flowchart of an example method for monitoring wear in accordance with the principles of the present invention.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

In accordance with an aspect of the invention, a gas turbine engine is provided including an optical wear probe that is embedded within a part that has a surface susceptible to wearing. Typically such a part will be a metal part that is adjacent another metal part wherein they are both subject to vibration, expansion, contraction, or other movement relative to one another. Such an arrangement of parts can occur at various locations in either the high-temperature or low-temperature sections of a gas turbine. One such location, used for example purposes only, may be a transition exit floating seal portion 100 such as that shown in FIG. 1

Figure 1:
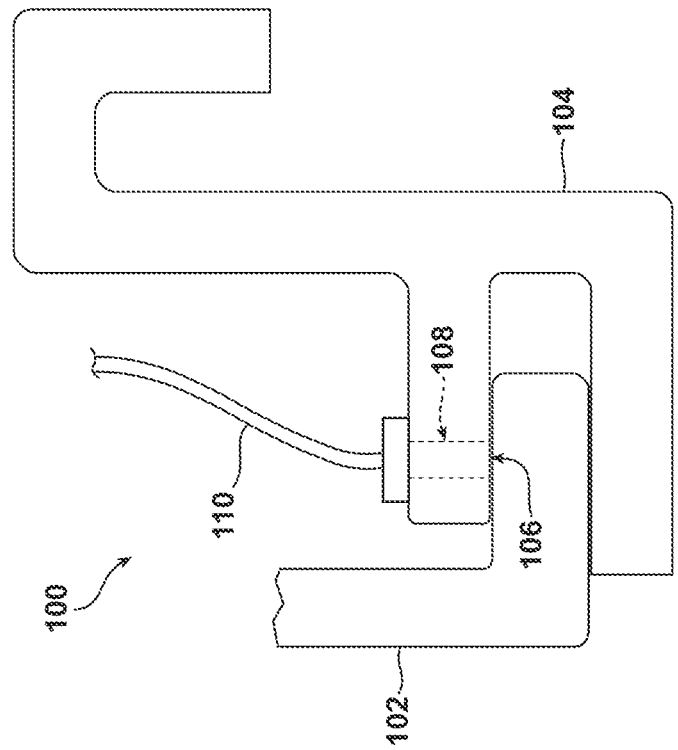
FIG. 1 illustrates an example portion of a gas turbine engine where a wear monitor in accordance with the principles of the present invention may be located.

In FIG. 1, a left seal portion 102 fits within a groove of a right seal portion 104. This arrangement creates an interface 106 between the two seal portions 102, 104 where wear may occur. Accordingly, a wear probe 108 is embedded within one of the seal portions (e.g., 104) such that it may monitor wear that is occurring at the interface 106. A cable 110 is shown as well that can provide input signals to the wear probe 108 and receive output signals from the wear probe 108.

Figure 2:
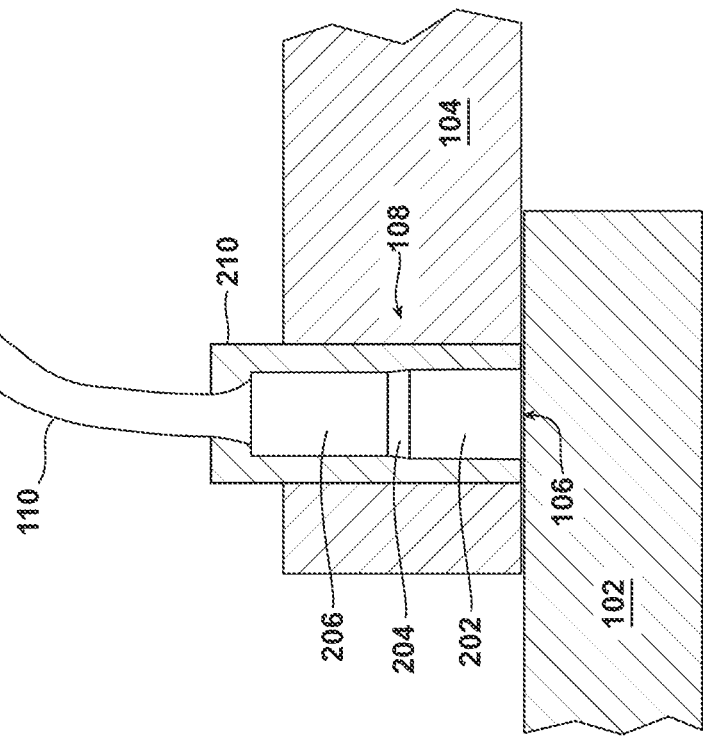
FIG. 2 illustrates a more detailed view of the portions of FIG. 1.

FIG. 2 illustrates more details regarding the placement and the construction of the wear probe 108. The wear probe 108 includes an optical guide 202 and a plurality of optical fibers 206. The optical guide 202 and fibers 206 are separated by a gap 204. The gap 204 prevents ends of the fibers 206 from rubbing against the optical guide 202. These elements of the wear probe 108 are enclosed within a housing 210. The housing 210 is embedded within the seal portion 104 so that one end of the optical guide 202, i.e., a first end 202a, is substantially flush with a surface of the seal portion 104 at the interface 106. The shape of the housing 210 can vary to accommodate embedding the wear probe 108 in a variety of different locations and materials.

The optical guide 202 may for example be constructed from quartz or other similar light-transmitting material. As the surface of the seal portion 104 in the neighborhood of the interface 106 wears during the operation of the gas turbine engine, the quartz of the optical guide 202 will wear as well so that the first end 202a remains substantially flush with the surface of the seal portion 104. Thus, as wear occurs at the interface 106, the length of the optical guide 202 will be shortened.

Figure 3:
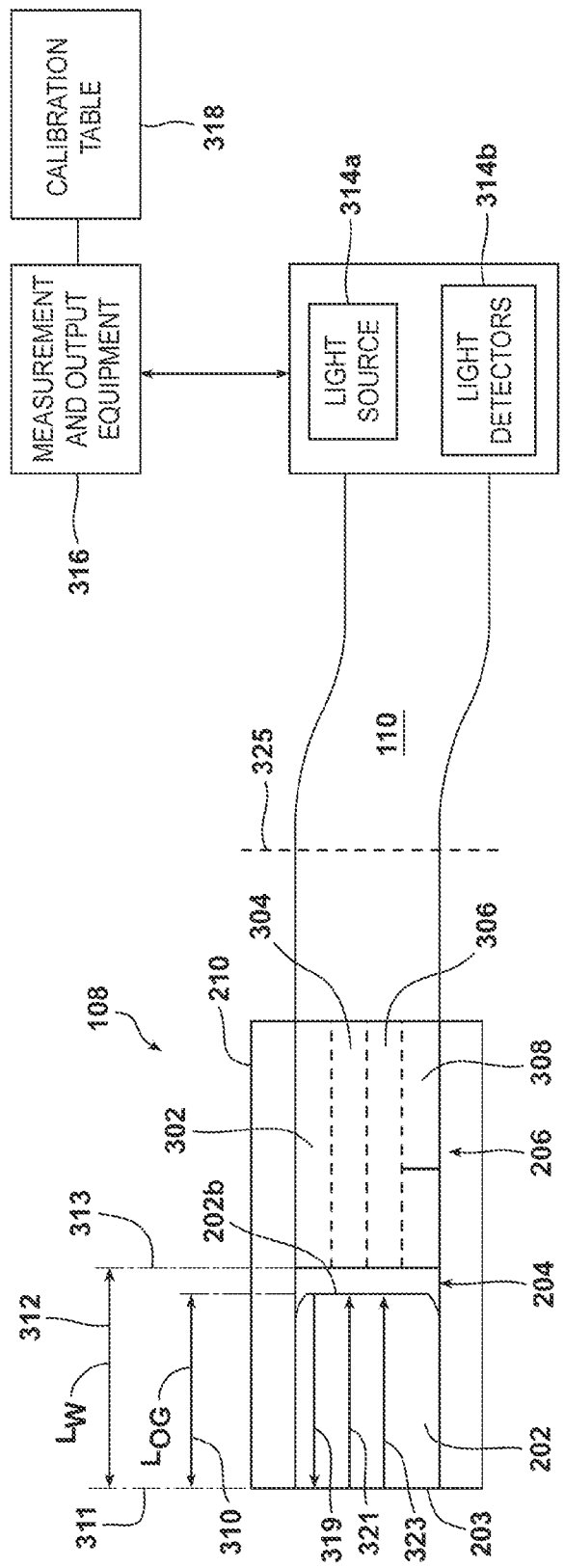
FIG. 3 illustrates a schematic view of a wear probe in accordance with the principles of the present invention.

FIG. 3 illustrates further details about the wear probe 108. In FIG. 3, the wear probe 108 is depicted without explicitly showing the seal portions 102 and 104. In FIG. 3, there is a vertical line 311 that represents a location of the interface 106 between the seal portions 102, 104. This location can also be referred to as the wearing surface because this is where the wearing that is being monitored is occurring. There is also another vertical line 313 that represents a first end of the optical fibers 206 located adjacent to a second end 202b of the optical guide 202 at the gap 204. The opposite, second end of the optical fibers terminates at a light source 314a and light detectors 314b. Thus, there is a distance $L_w$ 312 that is a distance between the wearing surface and the first end of the optical fibers 206 and there is a distance $L_{OG}$ 310 that is a length of the optical guide 202. As mentioned above, a wearing occurs at the interface 106, the optical guide 202 will experience wearing, as well and the length $L_{OG}$ 310 will become shorter, thereby making the distance $L_W$ 312 also shorter.

The fibers 206 are shown schematically in FIG. 3 as four separate bundles. In particular, there is a transmit fiber bundle 302 that receives light from the light source 314a so that the received light is emitted from the first end of the transmit bundle (i.e., vertical line 313) which can be referred to as the sensor tip. The emitted light 319 will travel through the optical guide 202 where it will strike a surface of the seal portion 102 at the interface 106 (See FIG. 2). Some of the emitted light will be reflected in a first reflected light path 321 to a first receive fiber bundle 304 and some will be reflected along a second reflected light path 323 to a second receive fiber bundle 306. The reflected light from each receive fiber bundle 304, 306 is transmitted back to respective light detectors 314b. More details about the reflected light are provided below with respect to FIG. 6.

There may also be a fourth fiber bundle 308 that provides a reference signal. The heat where the wear probe 108 is located as well as the area that the fiber bundles 304, 306, 308 traverse may introduce unwanted optical and/or thermal noise. The optical fiber bundle 308 does not extend all the way to the first end of the optical fibers 206 (e.g., vertical line 313) and, thus, does not receive reflected light such as the two receive fiber bundles 304, 306. In other words, the fourth fiber bundle 308 is optically isolated from any light emitted by the transmit fiber bundle 302. However, the fiber bundle 308 is located substantially where the receive fiber bundles 304, 306 are located and they all traverse similar signal paths. Thus, the fourth fiber bundle 308 produces an output signal for the light detectors 314b that represents an amount of optical and/or thermal noise that is likely also present in the signals from the two receive fiber bundles 304, 306.

Thus, the light detectors 314b detect a first signal that represents an amount of light that was received from the first receive fiber bundle 304 and detect a second signal that represents an amount of light that was received from the second receive fiber bundle 306. These two signals can be adjusted by subtracting a signal received from the fourth fiber bundle 308 that represents a background noise reference value.

The adjusted signals from the receive fiber bundles 304, 306 can then be communicated to measurement equipment 316 that can produce an output value that represents the length $L_W$ 312. Identifying the length $L_W$ 312 is effectively determining the length $L_{OG}$ 310 because the length of the gap 204 is a known, fixed dimension. Also, determining how the length $L_{OG}$ 310 may change over time is equivalent to determining how much the seal portion 104 is wearing at the interface 106. In particular, a calibration table 318 can be used to transform the detected light signals into a corresponding length value. Thus, when the wear probe 108 is first installed, it will have an initial length $L_w$ 312 which will produce an initial intensity of the detected light signals. As the optical guide 202 wears and the length $L_W$ 312 changes, the intensity of the detected light signals will be affected and this change can be used to determine how much $L_W$ has changed.

The fiber bundles 302, 304, 306, 308 constitute an optical proximity sensor that can be used to determine a length of the optical guide 202 and, thus, monitor an amount of wear between two wearing surfaces. A light source 314a (e.g., infrared LEDs) transmits a beam of light through the transmit fiber bundle 302 and the optical guide 202. The two separate receive fiber bundles 304, 306 pick up light reflected back through the optical guide 202 and transmit it to the light detectors 314. The light detectors 314b convert the reflected light into an electrical signal that is proportional to the distance $L_w$ 312 between the sensor tip and the wearing surface at the interface 106. Using stored calibration data 318, this electrical signal is converted into a value that represents that distance $L_W$ 312.

Referring to FIG. 2 and FIG. 3, the light source 314a produces a light signal of a known, or predetermined, intensity. One of ordinary skill will recognize that different light signals having various frequencies and intensities are contemplated within the scope of the present invention. The light signal from the light source 314a travels through the cable 110 within the optical fibers which make-up the transmit fiber bundle 302. The light signal that has travelled through the transmit fiber bundle 302 is emitted from the end, or tip, of the transmit fiber bundle 302 located at the vertical line 313. The emitted light travels across the gap 204 and enters the optical guide 202 where it travels to the interface 106 between parts, or seal portions, 102 and 104.

Light which exits the optical guide 202 impinges on a surface of the part, or seal portion, 102 and is reflected back into the optical guide 202. The reflected light that enters the optical guide 202 travels back through the optical guide 202 and the gap 204 where this reflected light then impinges on the receive fiber bundles 304, 306. In particular, one portion 321 of the reflected light impinges on one of the receive fiber bundles 304 and another portion 323 of the reflected light impinges on another of the receive fiber bundles 306. The receive fiber bundles 304, 306 then transmit their respective received light portions (e.g., 321, 323) along their respective optical fibers to respective light detectors 314b.

Each of the light detectors 314b receives a reflected light signal having a particular intensity. For example, the light detector may have a sensor, such as one or more photocells, which determines a number of photons received and generates an electrical signal that has a voltage that is proportional to that number of photons. Thus, each of the light detectors 314b produce a respective output signal having, for example a voltage magnitude, that is proportional to the intensity of the reflected light delivered by its corresponding receive fiber bundle (e.g., 304, 306). It may be understood that the light detectors 314b may include an amplifier to provide the voltage output. In general, a decrease in intensity of the reflected light, as compared with the initial intensity of light provided by the light source 314a, will depend (at least in part) on the length of an optical path which that reflected light traveled.

The different output signals from the light detectors 314b may then be communicated to the measurement and output equipment 316 where the output signal values may be compared with calibration data 318 to determine a length of the round trip optical path that the light from the light source 314a traveled. In particular, because all the elements in this round trip path have a known and unchanging length except for the optical guide 202, the measurement and output equipment 316 effectively calculates the length of the optical guide 202 based on the output signal values provided by light detectors 314b. For example, the measurement and output equipment 316 can include a processor which receives the two output signal values corresponding to the two receive fiber bundles 304, 306 and compares a ratio of those two output signal values to data in the calibration table 318 in order to produce a length value which indicates the length of the optical guide 202 and, hence, indicates an amount of wear of the part, or seal portion, 104.

Figure 5A:
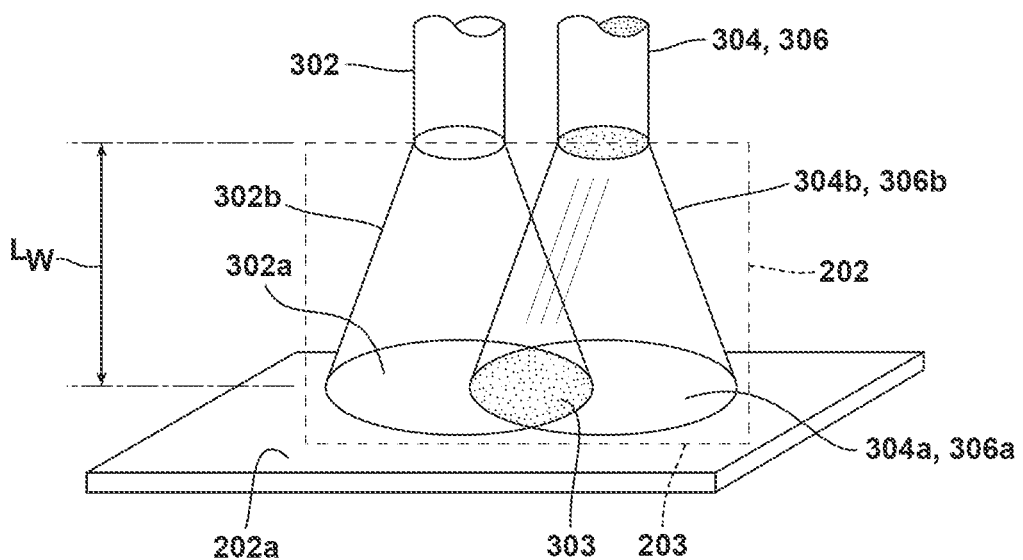
FIGS. 5A and 5B illustrate two different configurations of a fiber optic probe for detecting a distance to a target.
Figure 5B:
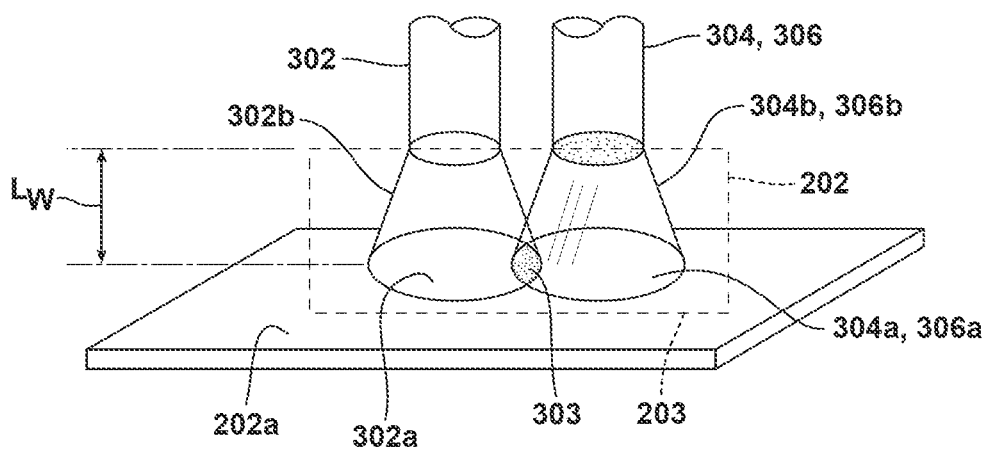

The theory relating the variation of reflected light intensity received at either of the receive bundles 304, 306 to a distance measurement, $L_W$ to a target may be described with reference to FIGS. 5A and 5B. In FIGS. 5A and 5B, a top surface of the target 202a is analogous to the surface of the seal portion 102 at the interface 106; and one end 203 of the optical guide 202 is ideally located flush with this surface of the target 202a. The light emitted from the first end of the transmit bundle 302 travels through the optical guide 202 along a generally conical or diverging field of view 302b to a transmit reflectance area 302a on the target 202a, depicted for illustrative purposes as a circular area 302a at the first end of the optical guide 202. Similarly, the receive bundles 304, 306 each have a respective generally conical or diverging field of view 304b, 306b extending to the surface of the target 202a where a respective reflectance area 304a, 306a is defined, as illustrated herein by a circular area depicting one of the reflectance areas 304a, 306a. An area of overlap 303 of the transmit reflectance area 302a and each of the receive reflectance areas 304a, 306a corresponds to the light that is reflected back to the respective receive bundles 304, 306. FIG. 5A may depict a length $L_W$ of the optical guide 202, where the respective reflectance areas 302a and 304a, 306a of the transmit bundle 302 and receive bundles 304, 306 may be defined by a maximum area for the area of overlap 303. FIG. 5B depicts a second length $L_W$ of the optical guide 202, such as following wear of the seal portion 104, with corresponding wear of the optical guide 202. As seen in FIG. 5B, the area of overlap 303 between the transmit reflectance area 302a and the receive reflectance areas 304a, 306a is reduced relative to the overlap seen in FIG. 5A, corresponding to a reduction of reflected light provided to the receive bundles 304, 306.

It should be noted that, although the fields of view 304b, 306b and reflectance areas 304a, 306a for the two receive bundles 304, 306 are illustrated at the same location in FIGS. 5A and 5B, the reflectance areas 304a, 306a of the receive bundles 304, 306 will have unique areas of overlap with the transmit reflectance area 302a, i.e., unique optical paths, to provide unique outputs of reflected light to the receive bundles 304, 306.

FIG. 5C illustrates a graph of the output 502 of an optical proximity sensor similar to that of FIG. 5A and FIG. 5B that detects light received from a "target". Starting near the left side of the graph, when the target is relatively close to the sensor tip, the detected reflected light is minimal. As the target is moved further away from the sensor tip, the amount of reflected light that illuminates the receive fiber bundles 304, 306 increases sharply. At some point, a maximum value 504 occurs. This point would correspond to FIG. 5A when the area of overlap 303 is at its maximum. As the distance between the sensor tip and the target further increases, the amount of detected reflected light decreases. The distance 506 between the sensor tip and the target at which the maximum value 504 occurs provides a readily usable calibration reference position at which the output signal from an optical proximity sensor can be normalized in order to provide a consistent sensitivity factor that is independent of the finish of the surface of the target. Accordingly, the wear probe 108 can provide an output signal proportional to the distance $L_W$ 312 independent of the reflection characteristics of the surface of the seal portion 102 at the interface region 106. As described in more detail below, and as briefly mentioned above, each receive fiber bundle 304, 306 can individually provide a respective output signal proportional to the distance $L_W$ 312. Rather than relying on the two output signals as absolute measurements of $L_W$ 312, the ratio of the two output signals can be utilized to provide a value that is representative of the distance $L_W$ 312. Use of a ratio of the two output signals can compensate for degradation of various components of the wear probe 108 that may occur over time.

As the optical guide 202 of the wear probe 108 wears away and its length $L_{OG}$ 310 shortens, the change in length can be monitored by monitoring change in the reflected intensity transmitted by the two receive fiber bundles 304, 306 to the light detectors 314. The output voltage signal from the light detectors 314 is proportional to the amount of detected reflected light which is proportional to the length $L_W$ 312. The change in the length $L_W$ 312 can be directly attributed to an amount that the surface of the seal portion 104 has worn.

Each of the receive fiber bundles 304, 306 comprise a separate optical proximity sensor as described, in general, with respect to FIG. 5C, where each receive fiber bundle receives reflected light from the transmit light bundle 302 along a different optical path. Thus, a separate graph similar to that of FIG. 5C describes the operation of each of the receive fiber bundles 304, 306. Hence, the light detectors 314b will have a first output value for the first receive fiber bundle 304 that could correspond to a particular value for $L_W$ 312 and will have a second output value for the second receive fiber bundle 306 that could correspond to a particular value for $L_W$ 312. When properly calibrated, those two values for $L_W$ 312 should be substantially similar.

Although either graph could thus be used to calculate a distance based on an output signal level, using both output values in a ratiometric manner provides beneficial results. In other words, the calibration table 318 can correlate a ratio value to a corresponding distance measurement wherein the ratio value is the ratio of the first output value to the second output value. Thus, even though the individual receive fiber bundles 304, 306 may degrade (and therefore affect their absolute measurement values), their degradation is anticipated to be similar so that the ratio information used in the calibration table 318 remains an accurate indication of distance.

An additional benefit of the optical guide 202 is that it guides and focuses the reflected light 321, 323 in a direction substantially normal to the front plane of the receive fiber bundles 304, 306. This has the effect of increasing the numerical aperture of the sensor and increasing available light intensity.

Figure 4:
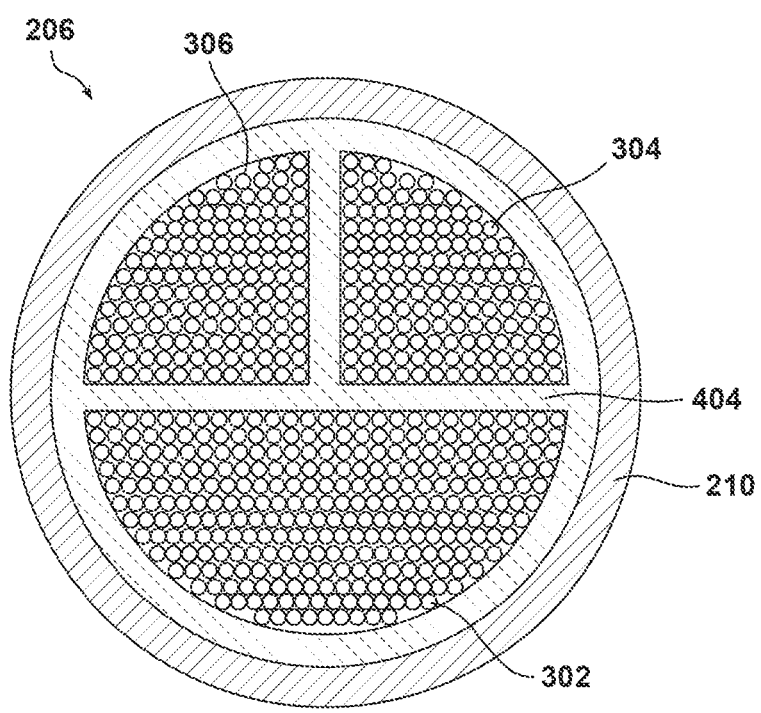
FIG. 4 illustrates an example optical fiber arrangement of the wear probe of FIG. 3.

FIG. 4 depicts an exemplary arrangement of the transmit fiber bundle 302 and the two receive fiber bundles 304, 306. The bundles 302, 304, 306 are shown in circular arrangement being separated by a bonding material 404 such as, for example, high temperature ceramic cement, and encased in a housing 210 comprised of, for example, stainless steel or a similar high temperature alloy metal. The outside diameter of the housing 210 can, for example, be about 1 cm. Returning to FIG. 3, the wear probe 108 can be about 40 mm in length with the optical guide 202 being about 20 mm. However, depending on the parts being monitored for wear, the optical guide 202 can also be about 5 mm to about 10 mm in length. The air gap 204 can be 1 mm or less is length. The cable 110 that connects the wear probe 108 to external equipment can be meters in length and have a transition point 325 where portions of the cable 110 to the left of the transition point 325 are constructed to withstand high-temperatures and portions of the cable 110 to the right of the transition point 325 may be constructed for much lower ambient temperatures.

Figure 6:
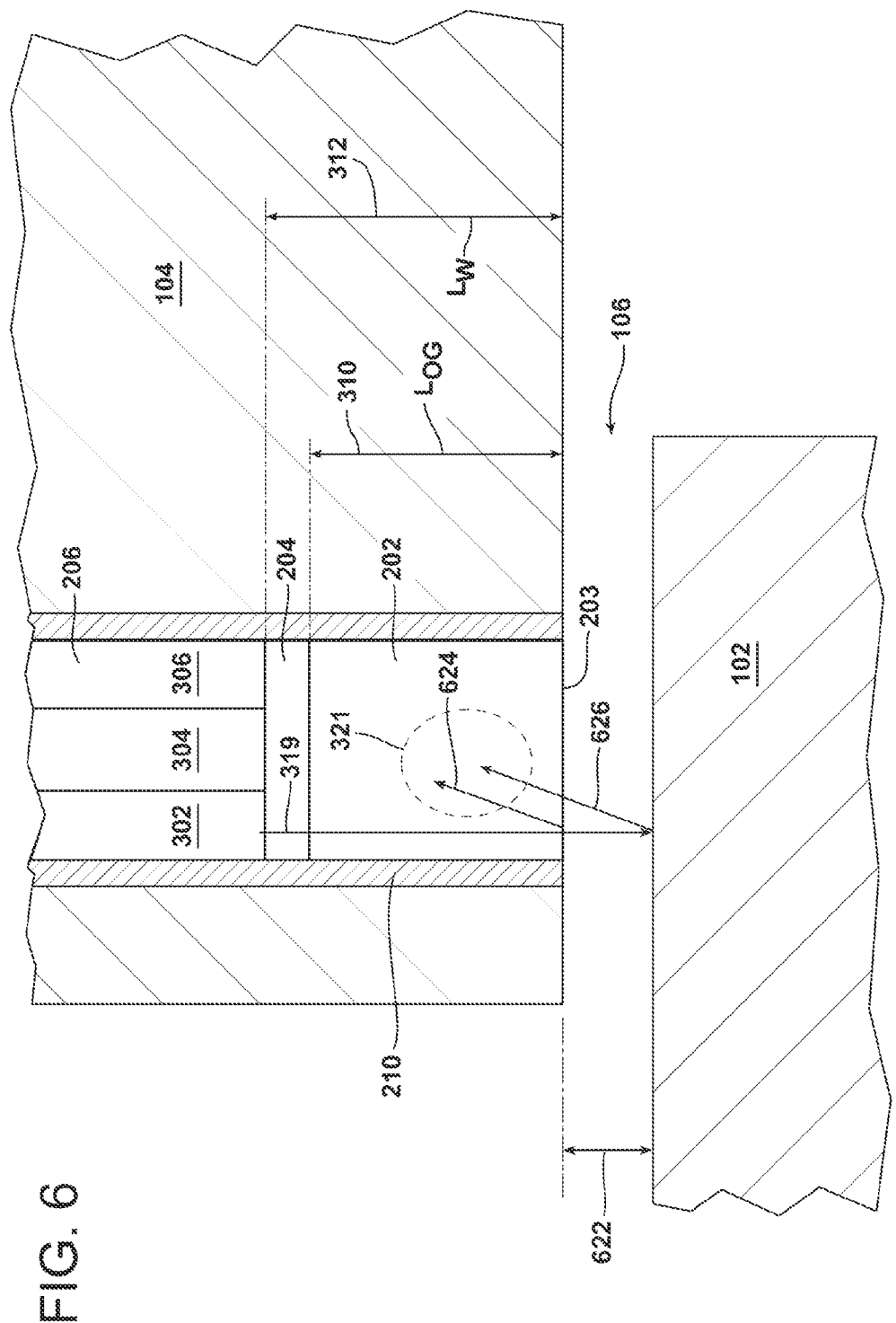
FIG. 6 illustrate a detailed view of an interface region where a wear sensor may be located in accordance with the principles of the present invention.

FIG. 6 provides a more detailed view of the interface area 106 between the two seal portions 104 and 106. As discussed above, an ideal configuration is when the seal portions 102 and 104 touch one another so that the end 203 of the optical guide 202 is in contact with the seal portion 102 at the interface 106. In this ideal configuration, the distance between the transmit fiber bundle and the reflective surface of the target, or seal portion 102, is simply the length $L_W$ 312.

However, in practical environments, the seal portions 102, 104 are independently vibrating and may be separated by a distance, or gap, 622 that varies. Thus, the emitted light 319 that is reflected back (e.g., reflected light 321) may also traverse the distance 622 in addition to traversing the length $L_{OG}$ 310 of the optical guide 202. Thus, the reflected light 321 that is captured by the first receive fiber bundle 304, for example, may include a portion 624 that internally reflects from the end 203 of the optical guide 202 and another portion 626 that traverses the gap 626, strikes the surface of the seal portion 102, and is reflected back into the optical guide 202. Similar behavior occurs for the other receive fiber bundle 306 as well.

Therefore, the intensity signals provided by the light detectors 314b to the measurement and output equipment 316 are affected by both the distance $L_{OG}$ 310 (or the length $L_W$ 312) and the gap distance 622. To account for the presence and variableness of the gap 622, the measurement and output equipment 316 can collect a number of output signal samples in a short time period. For example, 10 samples in a one second time period, for each receive fiber bundle 304, 306, may be collected. The samples from each receive fiber bundle 304, 306 can then be averaged in order to generate a value that minimizes the effect of the gap 622 on the measured data. Additionally, before averaging, the measurement and output equipment 316 can check the 10 samples (for example) and determine if any are statistical outliers and should be discarded. In this way, output signals representative of the length $L_W$ 312 can be calculated and used to determine the wear occurring at the interface 106 of the seal portions 102, 104.

FIG. 7 depicts a flowchart of an example method for monitoring wear in accordance with the principles of the present invention. In step 602, a wear sensor similar to that of FIG. 3 is embedded in a first part of a gas turbine engine to monitor wear of a surface of that first part which is adjacent a second part. In particular, the wear sensor includes an optical guide that has a first end that is flush with the surface of the first part where the wear is being monitored and a second end that is near a plurality of optical fibers. As the first part wears, the optical guide will wear a similar amount and shorten.

In step 604, a light source is used to introduce light at one end of a transmit fiber bundle. The light travels through the transmit fiber bundle and is emitted out the other end near the optical guide. The emitted light travels through the optical guide, is reflected by a surface of the second part. The reflected light travels back through the optical guide and is captured by separate receive fiber bundles and is transmitted to a light detector.

In step 606, the light detector detects the respective amount of light captured by the separate receive fiber bundles. For example, there may be a first receive bundle and a second receive bundle and the light detector produces a first and a second output signal value representative of the reflected light captured by first and second receive fiber bundles, respectively.

The light detector, in step 608, also receives light signals from another fiber bundle that represents the optical and/or thermal noise that may be present in the light signals received from the two receive fiber bundles. Accordingly, in step 610, the light detectors can adjust the first and second output signal values based on the optical and/or thermal noise information. Using the adjusted first and second values, a ratio of the two values can be calculated in step 612. Once the ratio has been calculated, then previously derived calibration data can be used, in step 614, to determine a distance between the end of the fiber bundles and the second turbine part that reflected the emitted light. Because this distance depends on the length of the optical guide, determining this distance effectively determines an amount of wear that has occurred on the first turbine part.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wear probe for monitoring wear of a part having a wearing surface, comprising:
   an optical guide having a first end and a second end, wherein the first end is configured to be located flush with the wearing surface such that as the wearing surface wears, the first end of the optical guide will wear as well so that the first end remains flush with the wearing surface;
   a fiber bundle having a first end and a second end, the first end of the fiber bundle located proximate to the second end of the optical guide, the fiber bundle comprising:
      a transmit fiber bundle comprising a first plurality of optical fibers; and
      a receive fiber bundle comprising a second plurality of optical fibers;
   a light source coupled with the second end of the transmit fiber bundle and configured to provide light to the second end of the transmit fiber bundle for transmission of light from the first end of the transmit fiber bundle through the optical guide to the first end of the optical guide;
   a light detector coupled with the second end of the receive fiber bundle and configured to detect reflected light that is reflected from the first end of the optical guide and is transmitted through the optical guide to be captured by the first end of the receive fiber bundle; and
   a processor configured to determine a length of the optical guide based on the detected reflected light.

2. The wear probe of claim 1, wherein the receive fiber bundle comprises:
   a first receive fiber bundle comprised of a first subset of the second plurality of optical fibers; and
   a second receive fiber bundle comprised of a second subset of the second plurality of optical fibers.

3. The wear probe of claim 2, wherein the light detector is configured to determine a first output signal based on reflected light captured by the first subset of optical fibers and a second output signal based on reflected light captured by the second subset of optical fibers.

4. The wear probe of claim 3, wherein the processor is configured to determine the length based on a ratio of the first output signal to the second output signal.

5. The wear probe of claim 4, further comprising:
   a third plurality of optical fibers, wherein each of the fibers in the third plurality of optical fibers has a respective first end optically isolated from the first end of the transmit fiber bundle and a respective second end coupled with the light detector;
   wherein the light detector is configured to detect signals emitted from the second ends of the third plurality of optical fibers and determine a reference signal value.

6. The wear probe of claim 5, wherein the reference signal value indicates thermal noise affecting the first and second output signals.

7. The wear probe of claim 5, wherein the processor is configured to adjust the first and second output signals based upon the reference signal value.

8. A gas turbine, comprising:
   a first part having a first outer surface;
   a second part having a second outer surface, the first outer surface located adjacent the second outer surface and creating an interface; and
   a wear probe, embedded in the first part, for monitoring wear of the first outer surface comprising:
      an optical guide having a first end and a second end, wherein the first end is configured to be located flush with the first outer surface such that as the wearing surface wears, the first end of the optical guide will wear as well so that the first end remains flush with the wearing surface;
      a fiber bundle having a first end and a second end, the first end of the fiber bundle located proximate to the second end of the optical guide, the fiber bundle comprising:
         a transmit fiber bundle comprising a first plurality of optical fibers; and
         a receive fiber bundle comprising a second plurality of optical fibers;
      a light source coupled with the second end of the transmit fiber bundle and configured to provide light to the second end of the transmit fiber bundle for transmission of the light from the first end of the transmit fiber bundle through the optical guide to the first end of the optical guide;
      a light detector coupled with the second end of the receive fiber bundle and configured to detect reflected light that is reflected from the first end of the optical guide and is transmitted through the optical guide to be captured by the first end of the receive fiber bundle; and
      a processor configured to determine a length of the optical guide based on the detected reflected light.

9. The wear probe of claim 8, wherein the receive fiber bundle comprises:
   a first receive fiber bundle comprised of a first subset of the second plurality of optical fibers; and
   a second receive fiber bundle comprised of a second subset of the second plurality of optical fibers.

10. The wear probe of claim 9, wherein the light detector is configured to determine a first output signal based on reflected light captured by the first subset of optical fibers and a second output signal based on reflected light captured by the second subset of optical fibers.

11. The wear probe of claim 10, wherein the processor is configured to determine the length based on a ratio of the first output signal to the second output signal.

12. The wear probe of claim 11, further comprising:
   a third plurality of optical fibers, wherein each of the fibers in the third plurality of optical fibers has a respective first end optically isolated from the first end of the transmit fiber bundle and a respective second end coupled with the light detector;
   wherein the light detector is configured to detect signals emitted from the second ends of the third plurality of optical fibers and determine a reference signal value.

13. The wear probe of claim 12, wherein the reference signal value indicates thermal noise affecting the first and second output signals.

14. The wear probe of claim 12, wherein the processor is configured to adjust the first and second output signals based upon the reference signal value.

15. The wear probe of claim 8, wherein the interface is located in a high-temperature portion of the gas turbine and the optical guide is formed of quartz.

16. A method for monitoring wear of a part having a wearing surface, comprising:
   providing an optical guide having a first end and a second end, wherein the first end is positioned flush with the wearing surface such that as the wearing surface wears the first end of the optical guide will wear as well so that the first end remains flush with the wearing surface;
   positioning a fiber bundle having a first end and a second end, the first end of the fiber bundle to be located proximate to the second end of the optical guide, the fiber bundle comprising:
   a transmit fiber bundle comprising a first plurality of optical fibers;
   a receive fiber bundle comprising a second plurality of optical fibers;
   transmitting light from a light source through the transmit fiber bundle to the second end of the optical guide, the transmitted light passing from the first end of the transmit fiber bundle through the optical guide to the first end of the optical guide;
   receiving, at the first end of the receiver fiber bundle, reflected light from the first end of the optical guide, the reflected light passing through the optical guide to the second end of the optical guide, and transmitting the reflected light through the fiber bundle to a light detector for detecting the reflected light; and
   determining a length of the optical guide based on the detected reflected light.

17. The method of claim 16, wherein the reflected light comprises:
   first reflected light travelling along a first optical path to provide a first output signal; and
   second reflected light travelling along a second optical path, different from the first optical path, to provide a second output signal.

18. The method of claim 17, further comprising:
   determining the length based on a ratio of the first output signal to the second output signal.

19. The method of claim 18, wherein the first and second optical paths comprise first and second optical fiber paths defined by the fiber bundle and have respective first ends located proximate to the second end of the optical guide and second ends coupled with the light detector, and further comprising:
   positioning a plurality of reference optical fibers within the optical bundle, wherein each of the fibers in the plurality of reference optical fibers has a respective first end optically isolated from the first ends of the first and second optical fiber paths and the reference optical fibers include a respective second end coupled with the light detector;
   detecting signals emitted from the second ends of the plurality of reference optical fibers;
   determining a reference signal value based upon the detected signals from the reference optical fibers; and
   adjusting the first and second output signals based upon the reference signal value.

20. The wear probe of claim 1, wherein the first end of the transmit fiber bundle and the first end of the receive fiber bundle are separated from the second end of the optical guide by a gap.

* * * * *